United States Patent
Cheng et al.

(10) Patent No.: US 8,406,103 B1
(45) Date of Patent: Mar. 26, 2013

(54) DATA RECOVERY DEVICE AND METHOD

(75) Inventors: Yen-Chien Cheng, Hsinchu (TW); Yung-Chi Yang, Hsinchu (TW)

(73) Assignee: Sunplus Technology Co., Ltd., Hsinchu (TW)

(*) Notice: Subject to any disclaimer, the term of this patent is extended or adjusted under 35 U.S.C. 154(b) by 0 days.

(21) Appl. No.: 13/342,974

(22) Filed: Jan. 4, 2012

(30) Foreign Application Priority Data

Sep. 16, 2011 (TW) .............................. 100133469 A

(51) Int. Cl.
*G11B 20/18* (2006.01)
*G11B 20/10* (2006.01)

(52) U.S. Cl. ............... 369/53.19; 369/53.35; 369/59.22; 369/124.01

(58) Field of Classification Search ............... 369/53.19, 369/53.35, 59.22, 59.2, 59.15, 59.16, 124.04, 369/124.06, 124.11, 124.12, 124.14, 124.01, 369/44.32
See application file for complete search history.

(56) References Cited

U.S. PATENT DOCUMENTS

| | | | | |
|---|---|---|---|---|
| 5,065,253 A * | 11/1991 | Ishii | ............................. | 369/53.19 |
| 5,719,847 A * | 2/1998 | Tateishi et al. | .............. | 369/53.19 |
| 6,282,161 B1 | 8/2001 | Son et al. | | |
| 6,430,130 B1 * | 8/2002 | Furukawa | ................... | 369/53.19 |
| 6,577,568 B1 * | 6/2003 | Konishi et al. | .............. | 369/44.32 |
| 6,658,054 B1 * | 12/2003 | Kuribayashi et al. | ......... | 375/232 |
| 2004/0105361 A1 * | 6/2004 | Arakawa | ..................... | 369/53.19 |
| 2004/0145977 A1 * | 7/2004 | Sakai et al. | ................. | 369/44.32 |
| 2004/0156278 A1 * | 8/2004 | Takeda | ........................ | 369/53.19 |
| 2004/0257930 A1 * | 12/2004 | Ohno | ........................ | 369/44.32 |
| 2006/0227688 A1 * | 10/2006 | Okamatsu | ................... | 369/53.19 |
| 2007/0030780 A1 * | 2/2007 | Padiy et al. | ................. | 369/53.19 |
| 2007/0290756 A1 * | 12/2007 | Lin et al. | ........................ | 330/278 |
| 2011/0189959 A1 * | 8/2011 | Rambeau et al. | ............. | 455/63.1 |

* cited by examiner

*Primary Examiner* — Thang Tran
(74) *Attorney, Agent, or Firm* — Jianq Chyun IP Office

(57) ABSTRACT

A data recovery device including a filter, a tilt detection unit, a tilt cancellation unit and a data conversion unit is provided. The filter filters a radio-frequency data stream to generate an original data stream. The tilt detection unit synthesizes a tangential push-pull data stream by employing a first to a fourth data streams, and generates a tilt direction signal according to symmetry of a curve composed by the tangential push-pull data stream. The tilt cancellation unit detects a plurality of rising areas and falling areas of the original data stream, and reconstructs a plurality of data points corresponding to the rising areas or falling areas in the original data stream so as to generate a tilt repair data stream. The data conversion unit recovers the tilt repair data stream to a modulation signal.

12 Claims, 8 Drawing Sheets

DATA RECOVERY DEVICE AND METHOD

CROSS-REFERENCE TO RELATED APPLICATION

This application claims the priority benefit of Taiwan application serial no. 100133469, filed on Sep. 16, 2011. The entirety of the above-mentioned patent application is hereby incorporated by reference herein and made a part of this specification.

BACKGROUND OF THE INVENTION

1. Field of the Invention

The invention relates to a data recovery device and method. Particularly, the invention relates to a data recovery device and method of an optical storage system.

2. Description of Related Art

In an optical storage system, a radio frequency (RF) signal picked up from a disc surface by an optical pickup head has to be processed by a data recovery device in order to recover a modulation signal representing real data and a clock signal. Regarding the signal pickup, the RF signal is usually deformed due to interferences, so that the data recovery device cannot recover the modulation signal representing the real data, for example, a tilt error.

There are two types of the tilt errors, which include a radial tilt error shown in FIG. 1A and a tangential tilt error shown in FIG. 1B, where a label 110 indicates a disc, and a label 120 indicates a track of the disc. As shown in FIG. 1A, the radial tilt error is an angle α formed between a light and a normal line 130 of a radial direction, which is mainly caused by a shape variation of the disc. Moreover, as shown in FIG. 1B, the tangential tilt error is an angle β formed between the light and a normal line 140 of a tangential direction, which is generally caused by poor assembling of the device.

In order to resolve the problem of the tilt error, U.S. Pat. No. 6,282,161 discloses a tilt adjusting method and apparatus using jitter feedback, in which a displacement sensor is used to observe an angle of a light reflected by the disc, so as to obtain a tilt direction. Then, a tilt driving motor is used to correspondingly adjust an objective lens to improve quality of an optical path. However, according to such method, the displacement sensor and the tilt driving motor have to be additionally configured, which may lead to a high cost of the optical pickup head. In other words, such method cannot be applied to a low cost digital video disc (DVD) player, and an application range of the optical pickup head is limited.

SUMMARY OF THE INVENTION

The invention is directed to a data recovery device, which improves readability of a radio frequency (RF) signal by cancelling a tangential tilt error. Moreover, the data recovery device is unnecessary to use a displacement sensor and a tile driving motor, which decreases a system fabrication cost.

The invention is directed to data recovery method, by which a tangential push-pull data stream is used to determine a tilt direction of a tangential tilt angle, and compensate shifted data points according to a determination result. In this way, readability of a radio frequency (RF) signal is improved.

The invention provides a data recovery device, which is adapted to recover a radio frequency (RF) data stream of an optical storage system into a modulation signal, where the RF data stream is converted from a RF signal, and the RF signal is obtained by adding a plurality of electrical signals. Moreover, the data recovery device includes a filter, a tilt detection unit, a tilt cancellation unit and a data conversion unit. The filter filters the RF data stream to generate an original data stream. The tilt detection unit receives a first to a fourth data streams converted from the electrical signals, and synthesizes a tangential push-pull data stream by employing the first to the fourth data streams. Moreover, the tilt detection unit generates a tilt direction signal according to symmetry of a curve composed by the tangential push-pull data stream. The tilt cancellation unit detects a plurality of rising areas and falling areas of the original data stream, and reconstructs a plurality of data points corresponding to the rising areas or falling areas in the original data stream according to the tilt direction signal so as to generate a tilt repair data stream. The data conversion unit recovers the tilt repair data stream to the modulation signal.

In an embodiment of the invention, the tilt detection unit includes a first adder, a second adder, a subtractor and a detector. The first adder adds the first data stream and the fourth data stream. The second adder adds the second data stream and the third data stream. The subtractor is electrically connected to the first adder and the second adder, and subtracts a data stream generated by the second adder from a data stream generated by the first adder to generate the tangential push-pull data stream. The detector detects a minimum data point and a maximum data point in the tangential push-pull data stream, and generates the tilt direction signal according to the minimum data point and the maximum data point.

In an embodiment of the invention, the tilt cancellation unit includes a rising edge detector, a falling edge detector and a phase comparator. The rising edge detector detects the rising areas of the original data stream to generate a rising clock. The falling edge detector detects the falling areas of the original data stream to generate a falling clock. The phase comparator selects one of the rising clock and the falling clock according to the tilt direction signal to serve as a reference clock, and repairs the original data stream according to the reference clock to generate the tilt repair data stream.

According to another aspect, the invention provides a data recovery method adapted to recover a radio frequency (RF) data stream of an optical storage system into a modulation signal, where the RF data stream is converted from a RF signal, and the RF signal is obtained by adding a plurality of electrical signals. Moreover, the data recovery includes following steps. The RF data stream is filtered to generate an original data stream. A first to a fourth data streams converted from the electrical signals are received. A tangential push-pull data stream is synthesized by employing the first to the fourth data streams, and a tilt direction signal is generated according to symmetry of a curve composed by the tangential push-pull data stream. A plurality of rising areas and falling areas of the original data stream are detected, and a plurality of data points corresponding to the rising areas or falling areas in the original data stream are reconstructed according to the tilt direction signal so as to generate a tilt repair data stream. Then, the tilt repair data stream is recovered to the modulation signal.

According to the above descriptions, the tilt detection unit is used to synthesize the tangential push-pull data stream, and a tilt direction of a tangential tilt angle is determined according to the tangential push-pull data stream. In this way, the tilt cancellation unit compensates the shifted data points according to the tilt direction signal generated by the tilt detection unit, so as to improve readability of the RF signal. Moreover, the tangential tilt error can be eliminated without using a displacement sensor and a tile driving motor, which avails decreasing a system fabrication cost. Moreover, the invention is not limited by different optical devices, and can be applied to any optical pickup head.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the invention, readability of a radio frequency (RF) signal is improved by cancelling a tangential tilt error. Therefore, before the embodiments of the invention are described, an influence of the tangential tilt error on the RF signal is first described below.

Figure 2:
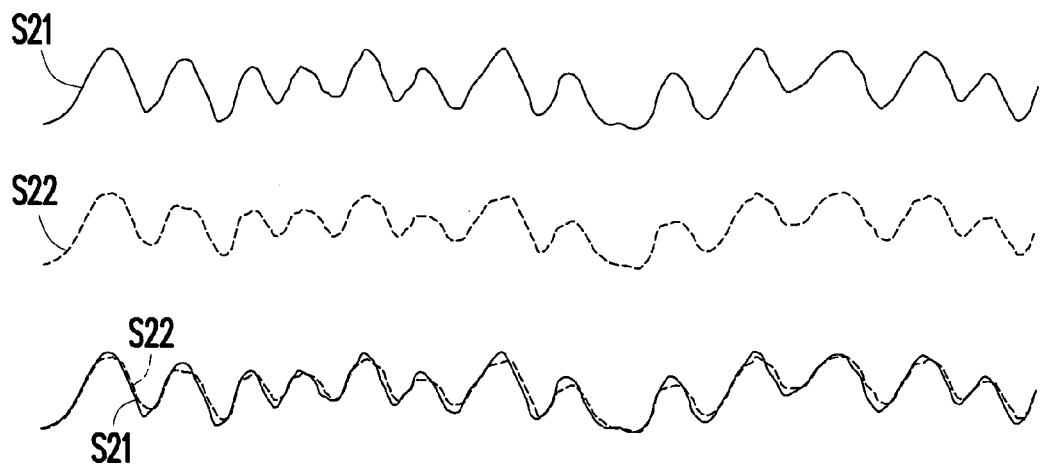
FIG. 2 is a waveform diagram of a radio frequency (RF) signals according to an embodiment of the invention.

FIG. 2 is a waveform diagram of RF signals according to an embodiment of the invention, in which a curve S21 presents an RF signal that is not influenced by the tangential tilt error, and a curve S22 represents an RF signal influenced by the tangential tilt error. Referring to FIG. 2, when the curve S21 and the curve S22 are stacked for comparison, rising edges of the curve S22 are almost overlapped with rising edges of the curve S21, and falling edges of the curve S22 are shifted upwards compared to falling edges of the curve S21. In other words, when the RF signal is influenced by the tangential tilt error, the falling edge or the rising edge of the RF signal is shifted, so that the falling edge or the rising edge of the RF signal has a phase difference.

Figure 1A:
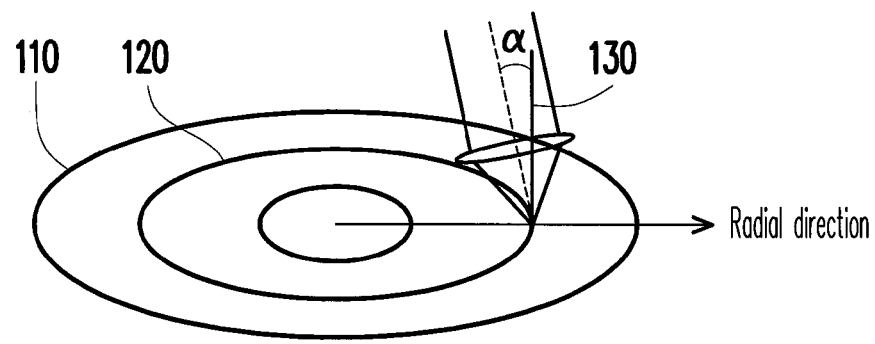
FIG. 1A and FIG. 1B are schematic diagrams of different tilt errors.
Figure 1B:
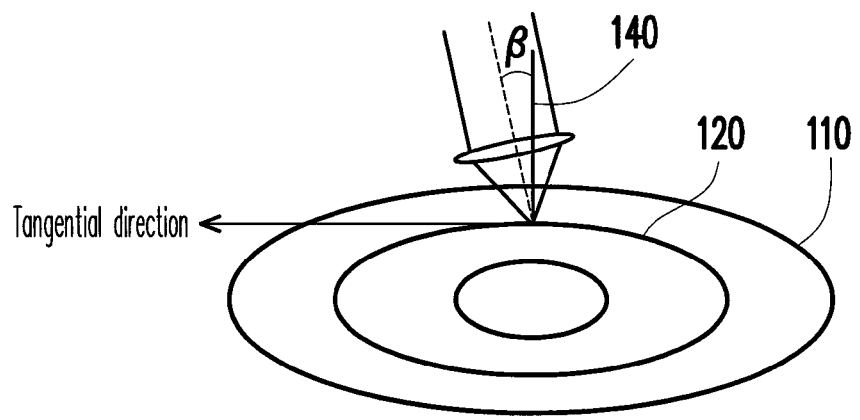

Moreover, whether the falling edge or the rising edge of the RF signal is shifted is determined according to the tilt direction of the tangential tilt angle. For example, as shown in FIG. 1B, if the light deviates the normal line 140 along the tangential direction, a positive-direction tangential tilt error is formed, and the rising edge of the RF signal is shifted. Comparatively, if the light deviates the normal line 140 along a direction opposite to the tangential direction, a negative-direction tangential tilt error is formed, and the falling edge of the RF signal is shifted.

Therefore, regarding compensation of the tangential tilt error, in the embodiment of the invention, the tilt direction of the tangential tilt angle is first determined, and then the shifted edge in the RF signal is compensated. Moreover, in the embodiment of the invention, a tangential push-pull signal is used to determine the tilt direction of the tangential tilt angle. Therefore, a characteristic of the tangential push-pull signal is first described below.

Figure 3:
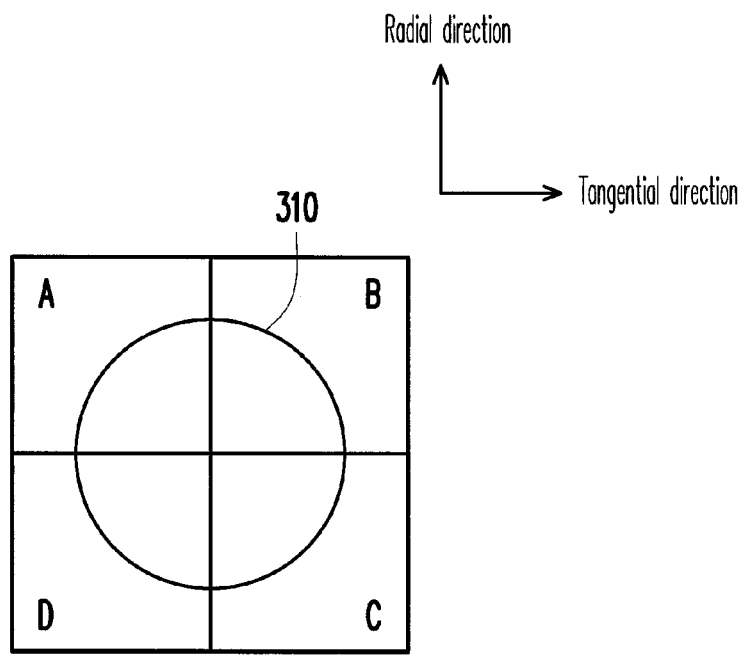
FIG. 3 is a schematic diagram illustrating a relative position of an optical detector and a light spot according to an embodiment of the invention.

FIG. 3 is a schematic diagram illustrating a relative position of an optical detector and a light spot according to an embodiment of the invention. As shown in FIG. 3, the optical detector is divided into four regions A, B, C and D for generating electrical signals $S_A$, $S_B$, $S_C$ and $S_D$ according to a distribution of a light spot 310, where the RF signal RF is obtained by adding the electrical signals $S_A$, $S_B$, $S_C$ and $S_D$, i.e. $RF=S_A+S_B+S_C+S_D$. Moreover, the tangential push-pull signal TPP is also synthesized according to the electrical signals $S_A$, $S_B$, $S_C$ and $S_D$, which is shown in a following equation (1):

$$TPP=[(S_A+S_D)-(S_B+S_C)] \quad (1)$$

Figure 4A:
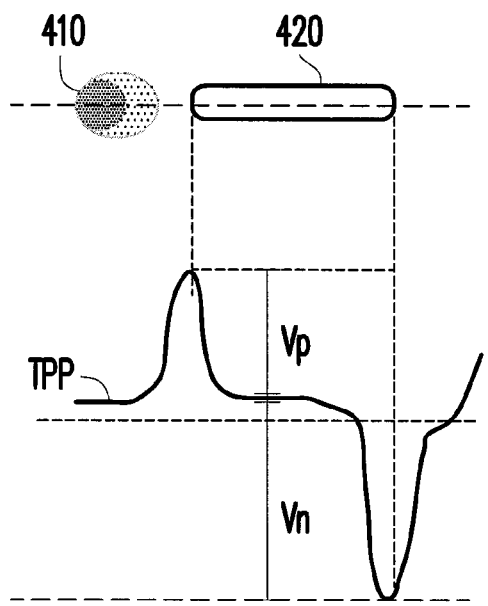
FIG. 4A to FIG. 4C are waveform diagrams of a tangential push-pull signal according to an embodiment of the invention.
Figure 4B:
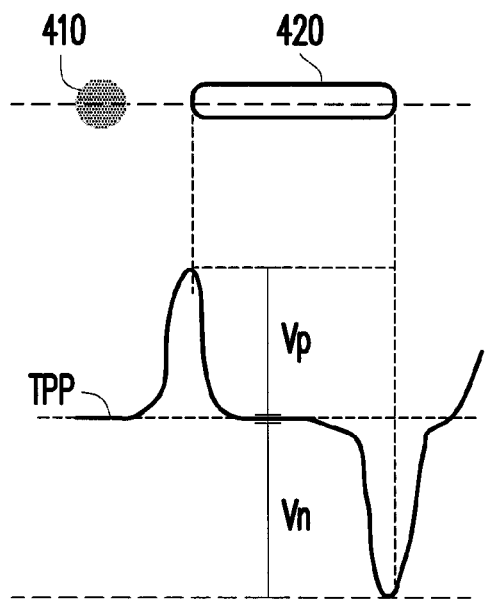
Figure 4C:
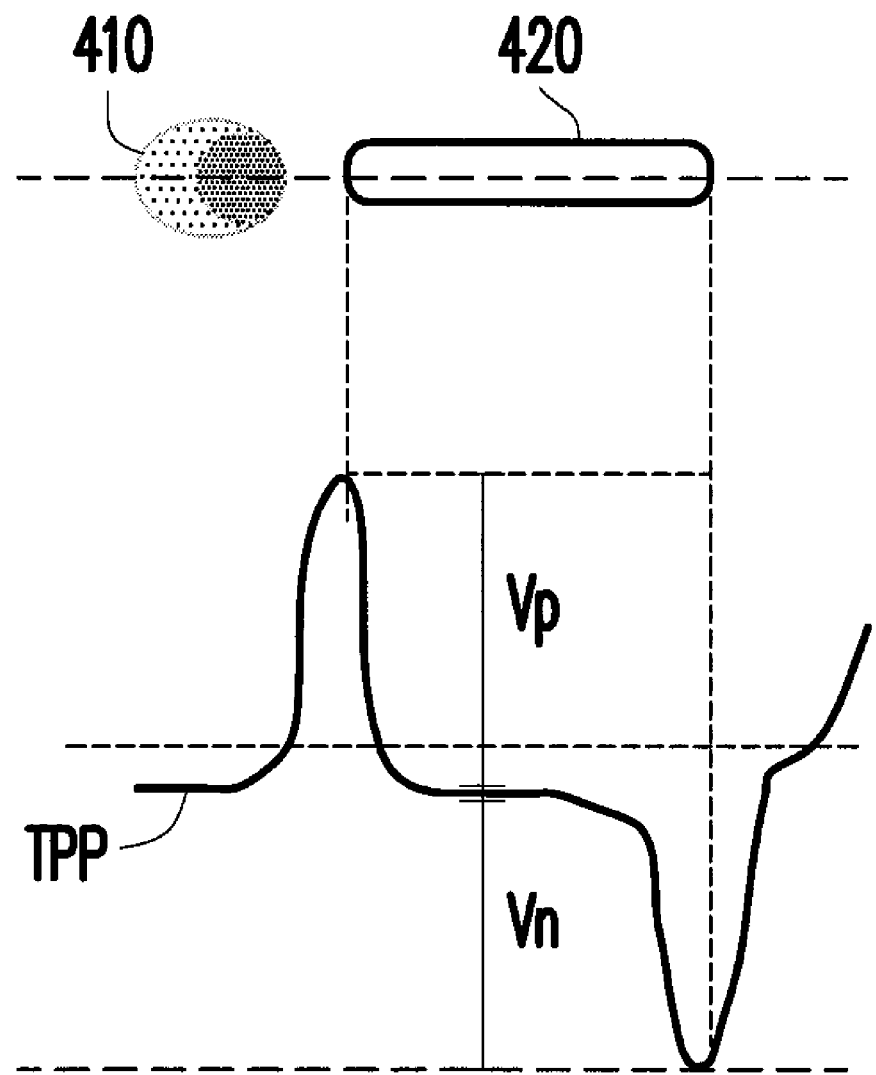

FIG. 4A to FIG. 4C are waveform diagrams of a tangential push-pull signal according to an embodiment of the invention, in which labels 410 and 420 respectively represent a light spot and a pit on a track. As shown in FIG. 4B, when there is none tangential tilt error, the light spot 410 is evenly distributed on the track, so that energy projected to the regions A, B, C and D of the optical detector are also even. Namely, the energy detected by a left part (the region A and the region D) of the optical detector is equal to the energy detected by a right part (the region B and the region C) of the optical detector. In this way, a waveform of the tangential push-pull signal TPP is symmetric, i.e. an amplitude Vp of a positive half-cycle of the tangential push-pull signal TPP is equal to an amplitude Vn of a negative half-cycle thereof.

Moreover, as shown in FIG. 4A, when the positive-direction tangential tilt error exists, the light spot 410 cannot be evenly distributed on the track. Now, the energy detected by the left part (the region A and the region D) of the optical detector is greater than the energy detected by the right part (the region B and the region C) of the optical detector. Therefore, the waveform of the tangential push-pull signal TPP is not symmetric, and the amplitude Vp of the positive half-cycle of the tangential push-pull signal TPP is smaller than the amplitude Vn of the negative half-cycle thereof. Comparatively, as shown in FIG. 4C, when the negative-direction tangential tilt error exists, the energy detected by the left part (the region A and the region D) of the optical detector is smaller than the energy detected by the right part (the region B and the region C) of the optical detector, and the amplitude Vp of the positive half-cycle of the tangential push-pull signal TPP is greater than the amplitude Vn of the negative half-cycle thereof. In other words, the tilt direction of the tangential tilt angle can be determined according to symmetry of the waveform of the tangential push-pull signal TPP.

After the influence of the tangential tilt error on the RF signal is described, embodiments of the invention are described below according to the above descriptions.

Figure 5:
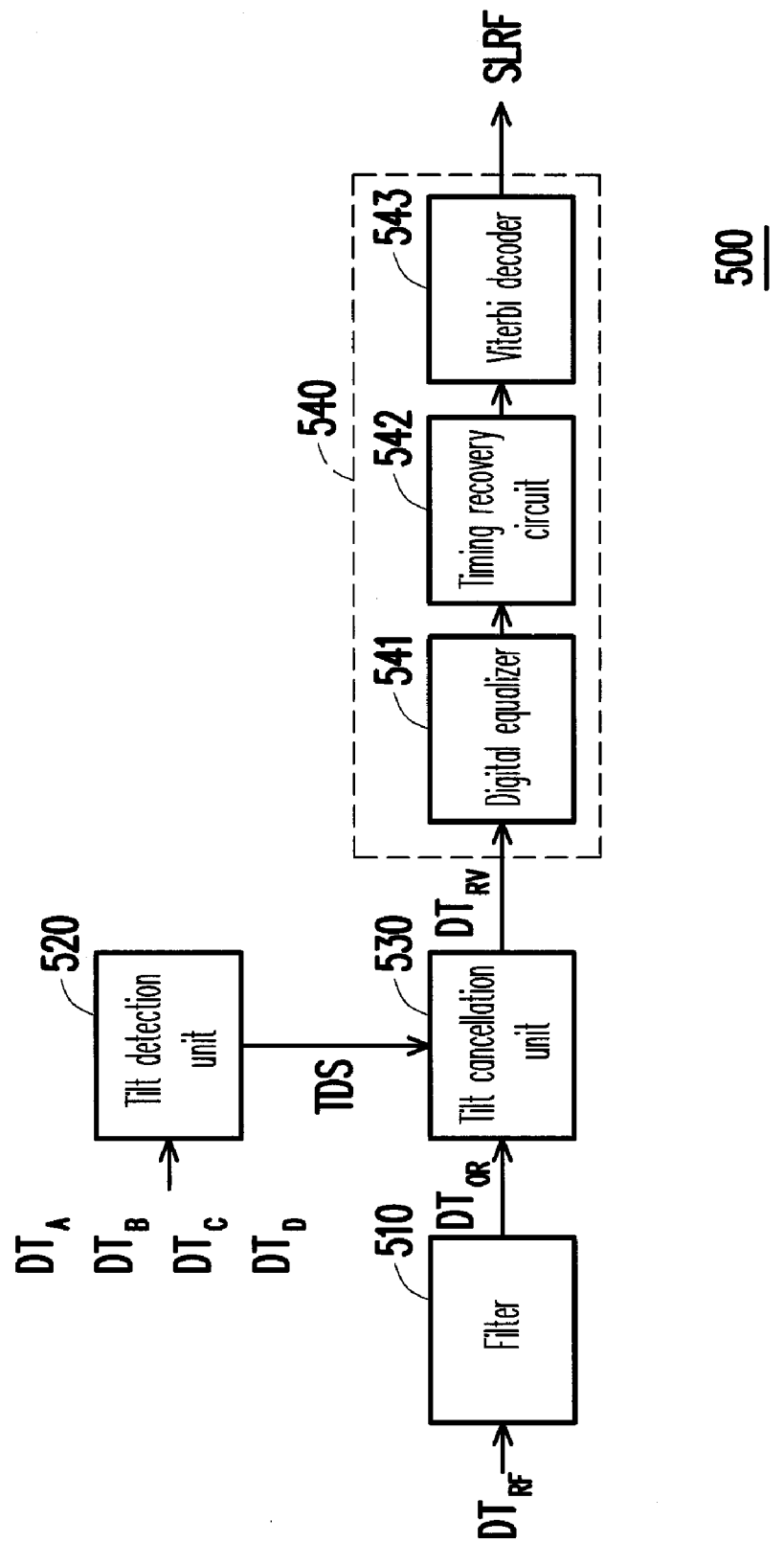
FIG. 5 is a block schematic diagram of a data recovery device according to an embodiment of the invention.

FIG. 5 is a block schematic diagram of a data recovery device according to an embodiment of the invention. Referring to FIG. 5, the data recovery device 500 includes a filter 510, a tilt detection unit 520, a tilt cancellation unit 530 and a data conversion unit 540. In a process of recovering the RF signal to a modulation signal SLRF, the RF signal is first converted into a plurality of digital sampling data points by an analog-to-digital converter (ADC). Comparatively, the electrical signals $S_A$, $S_B$, $S_C$ and $S_D$ generated by the optical detector are also respectively converted into a plurality of digital sampling data points by the ADC.

For simplicity's sake, in the following descriptions, the sampling data points converted from the RF signal are defined as an RF data stream $DT_{RF}$. Moreover, the sampling data points converted from the electrical signal $S_A$ are defined as a first data stream $DT_A$, the sampling data points converted from the electrical signal $S_B$ are defined as a second data stream $DT_B$, the sampling data points converted from the electrical signal $S_C$ are defined as a third data stream $DT_C$, and the sampling data points converted from the electrical signal $S_D$ are defined as a fourth data stream $DT_D$.

In operation, the data recovery device 500 is used to recover the RF data stream $DT_{RF}$ to the modulation signal SLRF. Here, the filter 510 receives the RF data stream $DT_{RF}$ and filters the RF data stream $DT_{RF}$. For example, the filter 510 filters a high-frequency component of the RF data stream $DT_{RF}$ to generate an original data stream $DT_{RF}$. On the other hand, the tilt detection unit 520 receives the first to the fourth data streams $DT_A$-$DT_D$, and synthesizes a tangential push-pull data stream $DT_{PP}$ by employing the first to the fourth data streams $DT_A$-$DT_D$. Then, the tilt detection unit 520, the tilt detection unit 520 determines a tilt direction of a tangential tilt angle according to symmetry of a curve composed by the tangential push-pull data stream $DT_{PP}$, and accordingly generates a tilt direction signal TDS.

Figure 6:
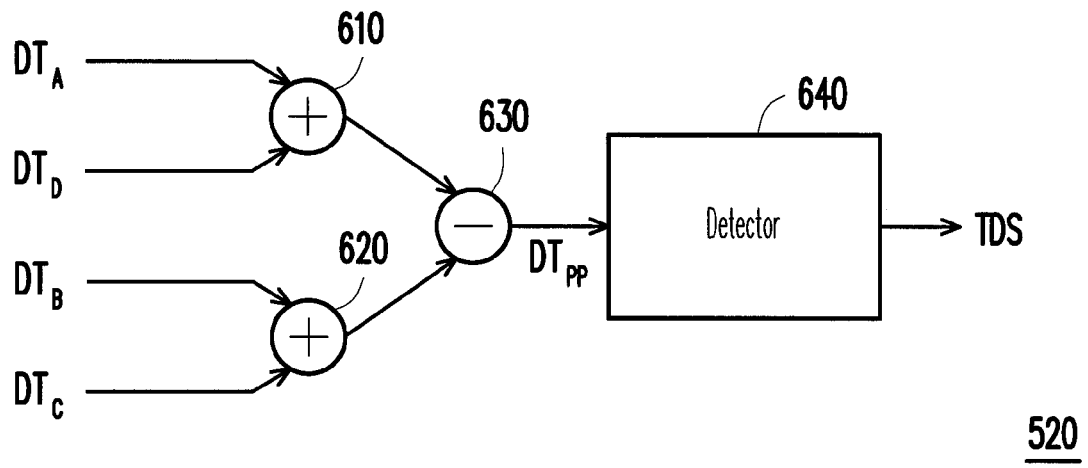
FIG. 6 is a block schematic diagram of a tilt detection unit according to an embodiment of the invention.

For example, FIG. 6 is a block schematic diagram of a tilt detection unit according to an embodiment of the invention. Referring to FIG. 6, the tilt detection unit 520 includes an adder 610, an adder 620, a subtractor 630 and a detector 640. The adder 610 adds the first data stream $DT_A$ and the fourth data stream $DT_D$, and the adder 620 adds the second data stream $DT_B$ and the third data stream $DT_C$. Moreover, the subtractor 630 is electrically connected to the adder 610 and the adder 620, and subtracts a data stream generated by the adder 620 from a data stream generated by the adder 610 to generate the tangential push-pull data stream $DT_{PP}$. In other words, $DT_{PP}=(DT_A+DT_D)-(DT_B+DT_C)$.

In this way, the curve formed by the tangential push-pull data stream $DT_{PP}$ has the characteristics of the tangential push-pull signals shown in FIG. 4A to FIG. 4C. Therefore, the detector 640 can generate the tilt direction signal TDS according to symmetry of the curve composed by the tangential push-pull data stream $DT_{PP}$. In determination of the symmetry of the curve, the detector 640 detects a minimum data point and a maximum data point in the tangential push-pull data stream $DT_{PP}$. Then, the detector 640 obtains a first amplitude that represents a positive half-cycle amplitude of the curve according to the maximum data point, and obtains a second amplitude that represents a negative half-cycle amplitude of the curve according to the minimum data point. In this way, the symmetry of the curve is determined by comparing the first amplitude and the second amplitude.

As shown in FIG. 4A to FIG. 4C, when the first amplitude is smaller than the second amplitude, it represents the RF signal is influenced by the positive-direction tangential tilt error. Therefore, the detector 640 generates the tilt direction signal TDS having a first level, and the tilt cancellation unit 530 reconstructs the data points corresponding to the rising areas in the original data stream $DT_{OR}$ according to the tilt direction signal TDS having the first level. Comparatively, when the first amplitude is greater than the second amplitude, it represents the RF signal is influenced by the negative-direction tangential tilt error. Therefore, the detector 640 generates the tilt direction signal TDS having a second level, and the tilt cancellation unit 530 reconstructs the data points corresponding to the falling areas in the original data stream $DT_{OR}$ according to the tilt direction signal TDS having the second level.

Moreover, before repairing the data points, the tilt cancellation unit 530 first detects a plurality of the rising areas and the falling areas of the original data stream $DT_{OR}$, and then reconstructs the data points corresponding to the rising areas or falling areas in the original data stream $DT_{OR}$ according to the tilt direction signal TDS, so as to generate a tilt repair data stream $DT_{RV}$.

Figure 7:
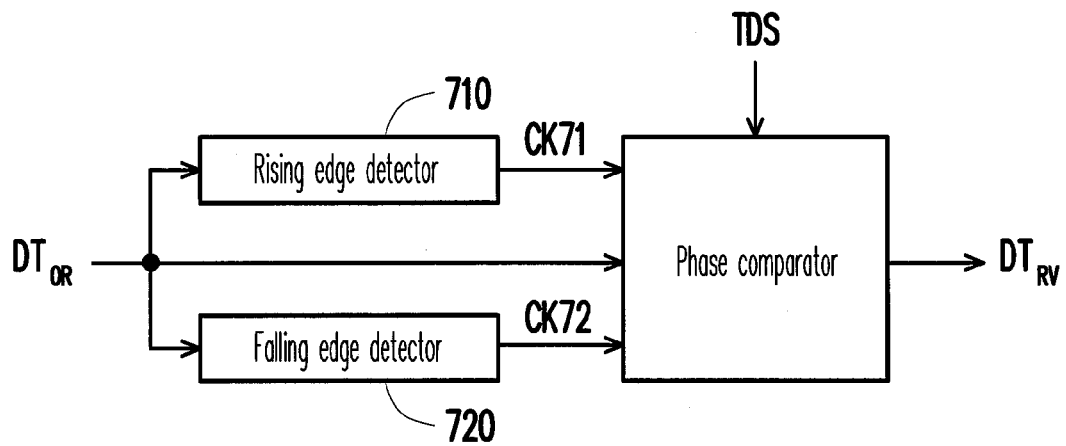
FIG. 7 is a block schematic diagram of a tilt cancellation unit according to an embodiment of the invention.
Figure 8A:
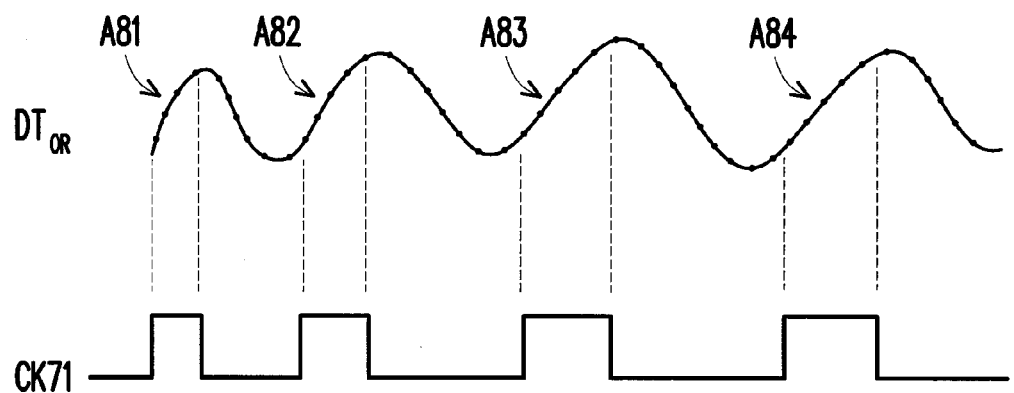
FIG. 8A and FIG. 8B are waveform diagrams used for describing a tilt cancellation unit according to an embodiment of the invention.
Figure 8B:
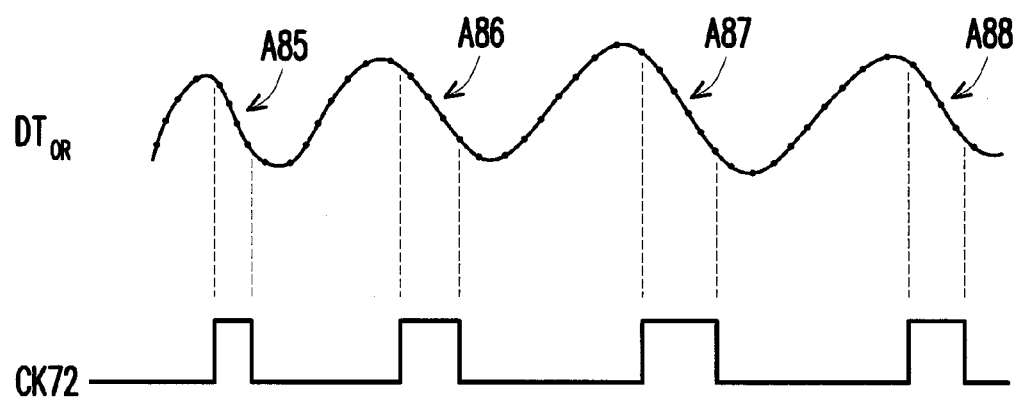

For example, FIG. 7 is a block schematic diagram of a tilt cancellation unit according to an embodiment of the invention. Referring to FIG. 7, the tilt cancellation unit 530 includes a rising edge detector 710, a falling edge detector 720 and a phase comparator 730. Moreover, FIG. 8A and FIG. 8B are waveform diagrams used for describing the tilt cancellation unit according to an embodiment of the invention. Referring to FIG. 7, FIG. 8A and FIG. 8B, the rising edge detector 710 detects the rising areas of the original data stream $DT_{OR}$, for example, the rising areas A81-A84 to generate a rising clock CK71. In this way, a plurality of the data points corresponding to the rising areas A81-A84 are searched from the original data stream $DT_{OR}$ according to the rising clock CK71.

Moreover, the falling edge detector 720 detects the falling areas of the original data stream $DT_{OR}$, for example, the falling areas A85-A88 to generate a falling clock CK72. In this way, a plurality of the data points corresponding to the falling areas A85-A88 are searched from the original data stream $DT_{OR}$ according to the falling clock CK72. On the other hand, the phase comparator 730 selects one of the rising clock CK71 and the falling clock CK72 according to the tilt direction signal TDS to serve as a reference clock, and repairs the original data stream $DT_{OR}$ according to the reference clock to generate the tilt repair data stream $DT_{RV}$.

Figure 9:
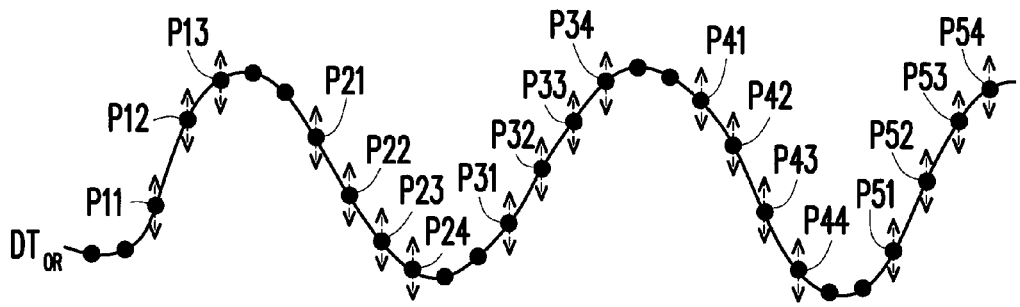
FIG. 9 is a schematic diagram of an original data stream according to an embodiment of the invention.

For example, FIG. 9 is a schematic diagram of the original data stream according to an embodiment of the invention. The original data stream $DT_{OR}$ includes data points P11-P13, P21-P24, P31-P34, P41-P44 and P51-P54. Here, the data points P11-P13, P31-P34 and P51-P54 correspond to the rising areas of the original data stream $DT_{OR}$, and the data points P21-P24 and P41-P44 correspond to the falling areas of the original data stream $DT_{OR}$.

When the positive-direction tangential tilt error exists, the phase comparator 730 receives the tilt direction signal TDS having the first level. Now, the phase comparator 730 selects the rising clock CK71 to serve as the reference clock, so as to reconstruct the data points P11-P13, P31-P34 and P51-P54 correspond to the rising areas of the original data stream $DT_{OR}$. Comparatively, when the negative-direction tangential tilt error exists, the phase comparator 730 receives the tilt direction signal TDS having the second level. Now, the phase comparator 730 selects the falling clock CK72 to serve as the reference clock, so as to reconstruct the data points P21-P24 and P41-P44 correspond to the falling areas of the original data stream $DT_{OR}$.

Referring to FIG. 5, the data conversion unit 540 recovers the tilt repair data stream $DT_{RV}$ generated by the tilt cancellation unit 530 to the modulation signal SLRF. For example, the data conversion unit 540 includes a digital equalizer 541, a timing recovery circuit 542 and a Viterbi decoder 543. The digital equalizer 541 compensates a gain of the tilt repair data stream $DT_{RV}$. The timing recovery circuit 542 generates a retiming data stream according to the compensated tilt repair data stream $DT_{RV}$. Then, the Viterbi decoder 543 decodes the retiming data stream to generate the modulation signal SLRF.

Figure 10:
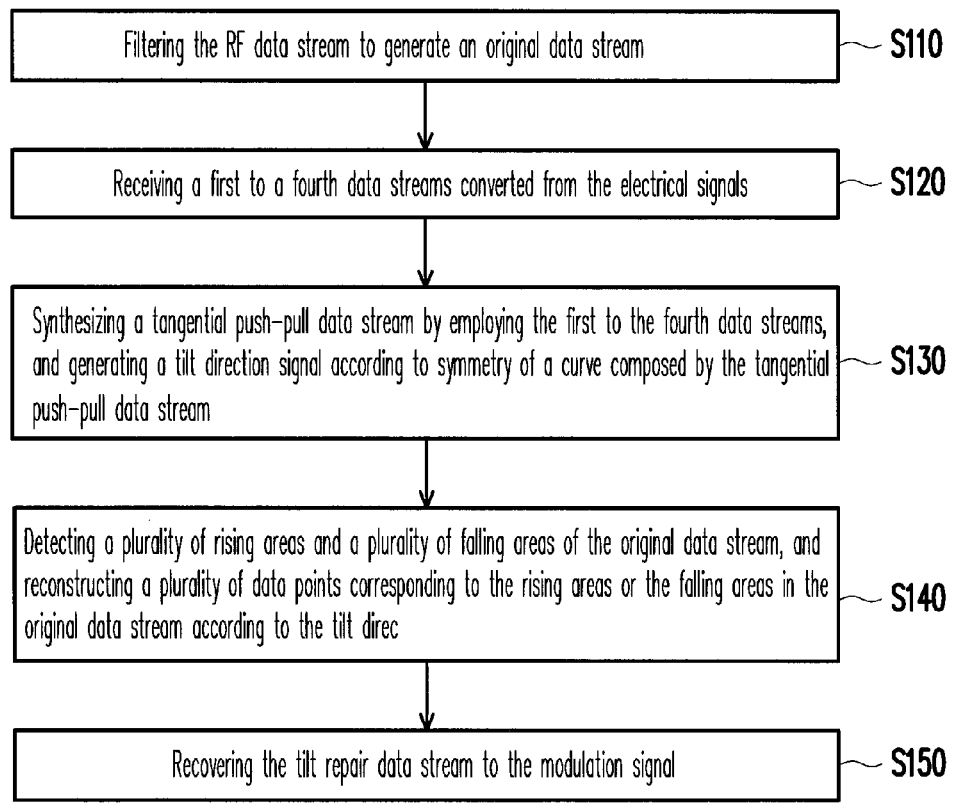
FIG. 10 is a flowchart illustrating a data recovery method according to an embodiment of the invention.

FIG. 10 is a flowchart illustrating a data recovery method according to an embodiment of the invention. The data recovery method is used to recover a RF data stream in an optical storage system into a modulation signal. Moreover, the RF data stream is converted from a RF signal, and the RF signal is obtained by adding a plurality of electrical signals. Referring to FIG. 10, in steps S110 and S120, the RF data stream is filtered to generate an original data stream, and a first to a fourth data streams converted from the electrical signals are received.

Moreover, in step S130, a tangential push-pull data stream is synthesized by employing the first to the fourth data streams, and a tilt direction signal is generated according to symmetry of a curve composed by the tangential push-pull data stream. Then, in step S140, a plurality of rising areas and falling areas of the original data stream are detected, and a plurality of data points corresponding to the rising areas or falling areas in the original data stream are reconstructed according to the tilt direction signal so as to generate a tilt repair data stream. Then, in step S150, the tilt repair data stream is recovered to a modulation signal. Details of each of the steps of the present embodiment have been described in the aforementioned embodiments, which are not repeated herein.

In summary, the tilt detection unit is used to synthesize the tangential push-pull data stream, and a tilt direction of a tangential tilt angle is determined according to the tangential push-pull data stream. In this way, the tilt cancellation unit compensates the shifted data points according to a determination result of the tilt detection unit, so as to improve readability of the RF signal. Moreover, the tangential tilt error can be eliminated without using a displacement sensor and a tile driving motor, which avails decreasing a system fabrication cost. Moreover, the invention is not limited by different optical devices, and can be applied to any optical pickup head.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data recovery device, adapted to recover a radio frequency (RF) data stream of an optical storage system into a modulation signal, wherein the RF data stream is converted from a RF signal, and the RF signal is obtained by calculating a plurality of electrical signals, the data recovery device comprising:
    a filter, filtering the RF data stream to generate an original data stream;
    a tilt detection unit, receiving a first to a fourth data streams converted from the electrical signals, and synthesizing a tangential push-pull data stream by employing the first to the fourth data streams, wherein the tilt detection unit generates a tilt direction signal according to symmetry of a curve composed by the tangential push-pull data stream;
    a tilt cancellation unit, detecting a plurality of rising areas and falling areas of the original data stream, and reconstructing a plurality of data points corresponding to the rising areas or the falling areas in the original data stream according to the tilt direction signal, so as to generate a tilt repair data stream; and
    a data conversion unit, recovering the tilt repair data stream to the modulation signal.

2. The data recovery device as claimed in claim 1, wherein the tilt detection unit comprises:
    a first adder, adding the first data stream and the fourth data stream;
    a second adder, adding the second data stream and the third data stream;
    a subtractor, electrically connected to the first adder and the second adder, and subtracting a data stream generated by the second adder from a data stream generated by the first adder to generate the tangential push-pull data stream; and
    a detector, detecting a minimum data point and a maximum data point in the tangential push-pull data stream, and generating the tilt direction signal according to the minimum data point and the maximum data point.

3. The data recovery device as claimed in claim 2, wherein the detector obtains a first amplitude according to the maximum data point, and obtains a second amplitude according to the minimum data point, and when the first amplitude is greater than the second amplitude, the detector generates the tilt direction signal having a first level, and the tilt cancellation unit accordingly reconstructs the data points corresponding to the rising areas in the original data stream, and when the first amplitude is smaller than the second amplitude, the detector generates the tilt direction signal having a second level, and the tilt cancellation unit accordingly reconstructs the data points corresponding to the falling areas in the original data stream.

4. The data recovery device as claimed in claim 1, wherein the tilt cancellation unit comprises:
    a rising edge detector, detecting the rising areas of the original data stream to generate a rising clock;
    a falling edge detector, detecting the falling areas of the original data stream to generate a falling clock; and
    a phase comparator, selecting one of the rising clock and the falling clock according to the tilt direction signal to serve as a reference clock, and repairing the original data stream according to the reference clock to generate the tilt repair data stream.

5. The data recovery device as claimed in claim 4, wherein the phase comparator selects the rising clock to serve as the reference clock according to the tilt direction signal having a first level, so as to reconstruct the data points corresponding to the rising areas in the original data stream, and the phase comparator selects the falling clock to serve as the reference clock according to the tilt direction signal having a second level, so as to reconstruct the data points corresponding to the falling areas in the original data stream.

6. The data recovery device as claimed in claim 1, wherein the data conversion unit comprises:
    a digital equalizer, compensating a gain of the tilt repair data stream;
    a timing recovery circuit, generating a retiming data stream according to the compensated tilt repair data stream; and
    a Viterbi decoder, decoding the retiming data stream to generate the modulation signal.

7. A data recovery method, adapted to recover a radio frequency (RF) data stream of an optical storage system into a modulation signal, wherein the RF data stream is converted from a RF signal, and the RF signal is obtained by calculating a plurality of electrical signals, the data recovery comprising:
    filtering the RF data stream to generate an original data stream;
    receiving a first to a fourth data streams converted from the electrical signals;

synthesizing a tangential push-pull data stream by employing the first to the fourth data streams, and generating a tilt direction signal according to symmetry of a curve composed by the tangential push-pull data stream;

detecting a plurality of rising areas and a plurality of falling areas of the original data stream, and reconstructing a plurality of data points corresponding to the rising areas or the falling areas in the original data stream according to the tilt direction signal, so as to generate a tilt repair data stream; and recovering the tilt repair data stream to the modulation signal.

8. The data recovery method as claimed in claim 7, wherein the step of synthesizing the tangential push-pull data stream by employing the first to the fourth data streams, and generating the tilt direction signal according to symmetry of the curve composed by the tangential push-pull data stream comprises:

adding the first data stream and the fourth data stream;

adding the second data stream and the third data stream;

subtracting a data stream generated by adding the second data stream and the third data stream from a data stream generated by adding the first data stream and the fourth data stream to generate the tangential push-pull data stream;

detecting a minimum data point and a maximum data point in the tangential push-pull data stream; and generating the tilt direction signal according to the minimum data point and the maximum data point.

9. The data recovery method as claimed in claim 8, wherein the step of generating the tilt direction signal according to the minimum data point and the maximum data point comprises:

obtaining a first amplitude according to the maximum data point, and obtaining a second amplitude according to the minimum data point;

generating the tilt direction signal having a first level when the first amplitude is greater than the second amplitude; and generating the tilt direction signal having a second level when the first amplitude is smaller than the second amplitude.

10. The data recovery method as claimed in claim 7, wherein the step of detecting the rising areas and the falling areas of the original data stream, and reconstructing the data points corresponding to the rising areas or the falling areas in the original data stream according to the tilt direction signal comprises:

detecting the rising areas of the original data stream to generate a rising clock;

detecting the falling areas of the original data stream to generate a falling clock; and selecting one of the rising clock and the falling clock according to the tilt direction signal to serve as a reference clock, and repairing the original data stream according to the reference clock.

11. The data recovery method as claimed in claim 10, wherein the step of selecting one of the rising clock and the falling clock according to the tilt direction signal to serve as the reference clock, and repairing the original data stream according to the reference clock comprises:

selecting the rising clock to serve as the reference clock according to the tilt direction signal having a first level, and reconstructing the data points corresponding to the rising areas in the original data stream; and selecting the falling clock to serve as the reference clock according to the tilt direction signal having a second level, and reconstructing the data points corresponding to the falling areas in the original data stream.

12. The data recovery method as claimed in claim 7, wherein the step of recovering the tilt repair data stream to the modulation signal comprises:

compensating a gain of the tilt repair data stream;

generating a retiming data stream according to the compensated tilt repair data stream; and decoding the retiming data stream to generate the modulation signal.

* * * * *